United States Patent [19]

MacWilliamson

[11] Patent Number: 5,129,617

[45] Date of Patent: Jul. 14, 1992

[54] HANG TAG FOR DISPLAYING EYEGLASSES

[76] Inventor: Roger MacWilliamson, 731 Carpenter Dr., Hollister, Calif. 95023

[21] Appl. No.: 713,825

[22] Filed: Jun. 12, 1991

[51] Int. Cl.$^5$ ............................................. F16M 13/00
[52] U.S. Cl. ................................. 248/690; 24/3 C; 206/5; 211/13; 248/906
[58] Field of Search .............. 248/906, 690, 316.5; 206/5, 459, 480, 478, 477, 483, 488, 489; 24/3 C, 3 G; 351/112, 155; 211/13

[56] References Cited

U.S. PATENT DOCUMENTS

| | | | |
|---|---|---|---|
| 2,212,596 | 8/1940 | Fuller | 351/155 X |
| 2,262,142 | 11/1941 | Karmsen | 206/5 R |
| 2,339,719 | 1/1944 | Waters | 248/690 |
| 3,381,806 | 5/1968 | McDonagh | 248/902 X |
| 3,710,996 | 1/1973 | Smilow | 223/87 |
| 3,799,357 | 3/1974 | Govang | 211/59.1 |
| 4,239,167 | 12/1980 | Lane | 248/902 X |
| 4,441,233 | 4/1984 | Swift | 24/16 PB |
| 4,724,967 | 2/1988 | Valiulis | 211/59.1 |
| 4,976,532 | 12/1990 | Nyman | 351/158 |
| 5,033,612 | 7/1991 | Bivins | 24/3 G |

FOREIGN PATENT DOCUMENTS 1202548  1/1960  France ........................... 248/690

*Primary Examiner*—David L. Talbott
*Attorney, Agent, or Firm*—Phillips, Moore, Lempio & Finley

[57] ABSTRACT

A hanger means and method of installing it for displaying eyewear at the point of sale while permitting the potential customer to try on the eyewear without the hanger means interfering with the person of the wearer is disclosed. The apparatus includes hanger means with a body portion that defines numerous apertures therethrough all in parallel relationship to each other and in the stated order to receive a support at the time of display, to receive the tongue section of the hanger means, and to receive the same one of the temple pieces of the eyewear for display at a point of sale. The hanger means further includes a tongue portion extending from the body portion with the longitudinal axis of the tongue portion being in substantially perpendicular relationship with the apertures. Optionally, the hanger means also includes an adhesive tag means for sealing the tongue portion to the temple piece of the eyewear. The method steps include bending the end of the tongue portion of the hanger means up to and passing it through one of the apertures, inserting the end of the temple piece of the eyewear through two of the apertures until the hanger means is adjacent the hinge between the temple piece and the lens holding region of the eyewear, and bending the tongue portion downward to bring it into contact with the outer surface of the temple piece to which the hanger means has been installed. The method also optionally includes sealing the tongue portion to the temple piece of the eyewear with an adhesive tag means.

5 Claims, 4 Drawing Sheets

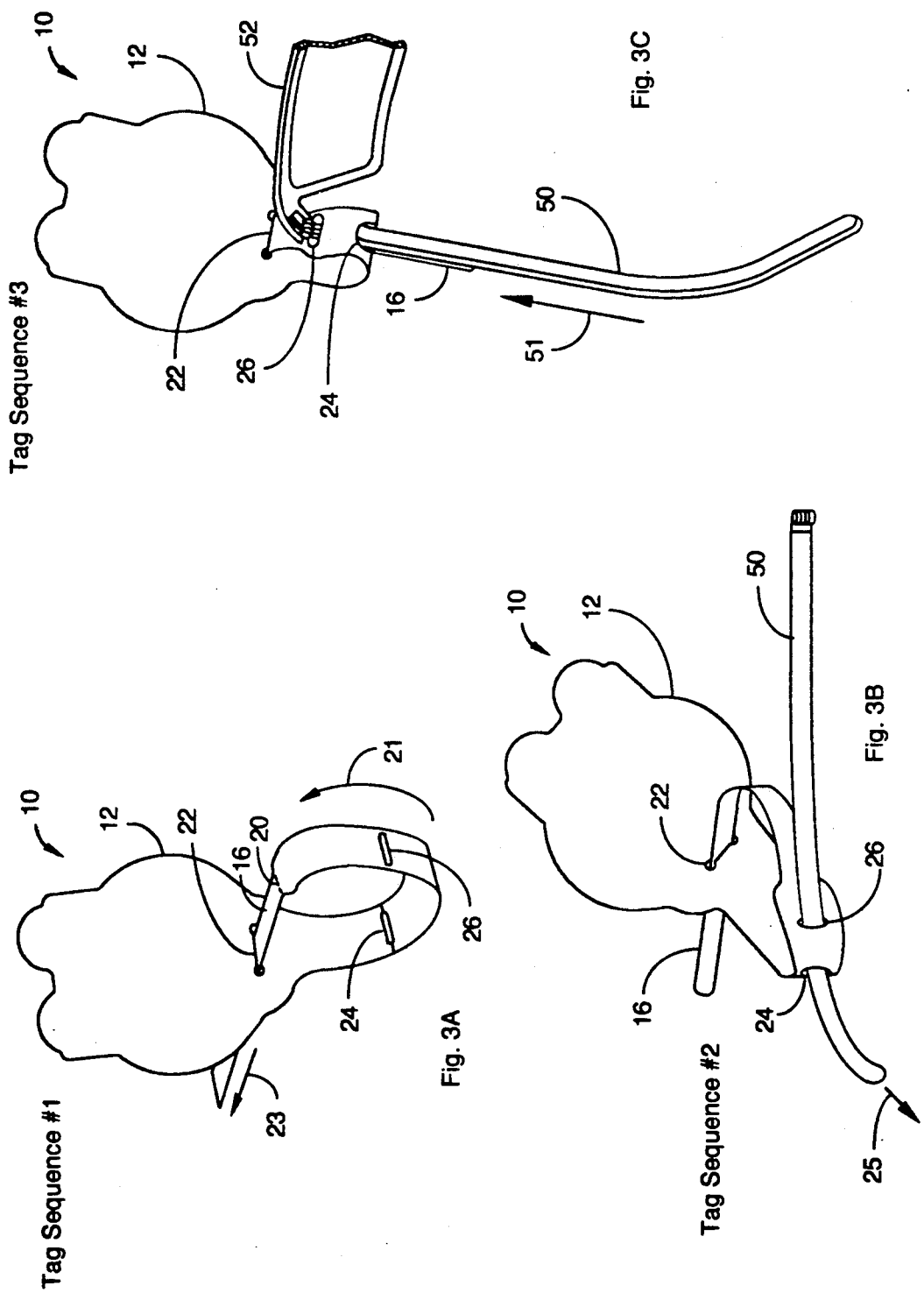

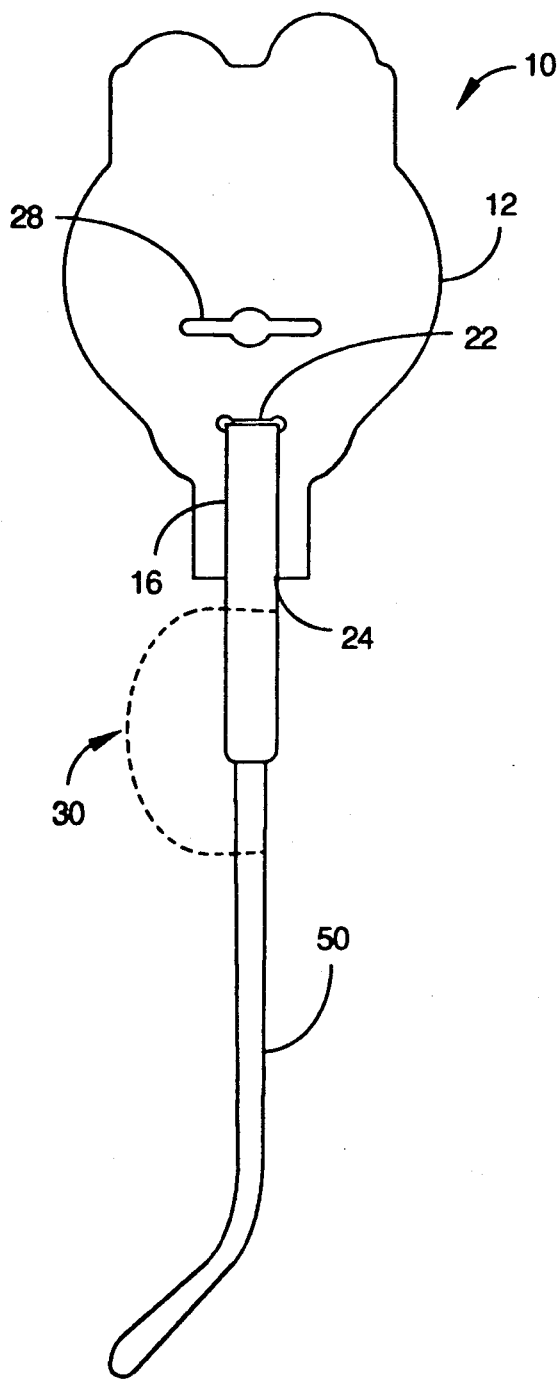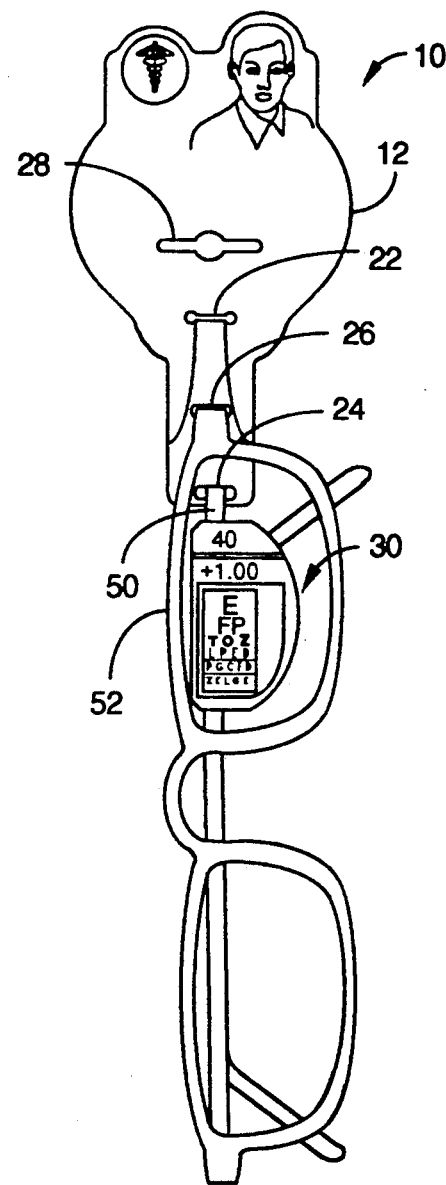
Fig. 4
Fig. 5

HANG TAG FOR DISPLAYING EYEGLASSES

FIELD OF THE INVENTION

This invention relates generally to displaying merchandise for retail sale and more particularly for a hang-tag device for displaying eyeglasses vertically for retail sale.

BACKGROUND OF THE INVENTION

When eyeglasses are displayed at the point of sale they are either displayed horizontally in a table top tray or on a vertically oriented display that is often designed to rotate. The horizontal tray is not practical in today's modern stores since they generally occupy much more floor space per unit of item for sale than the more modern vertical display systems.

The vertical display systems for eyeglasses generally take two forms: those that are specially designed to only display eyeglasses with holes to receive the ends of the temple pieces with an arm for supporting the bridge of the glasses that extends outward from the surface between the holes, or a peg-board system that accepts single wire or "U" shaped support arms. The peg-board design is a more versatile design since it can be used for displaying a broad range of products.

The prior methods for displaying eyeglasses on a peg-board display system was accomplished by either: packaging the eyeglasses in a vacuum formed package that is closed with a backing card with a hanging slot to slip over a standard support arm; or by attaching a tag around the bridge of the eyeglasses with this tag including a slot to slip over a standard support arm to display the eyeglasses horizontally.

The closed package has the clear disadvantage that the customer is unable to try the glasses on before they are purchased. The tag around the bridge on the other hand does permit the purchaser to try the glasses on before purchasing them, however, while trying them on the tag either hangs down over one or both lenses or extends upward in front of the purchasers forehead so that they are not able to get a true feel of appearance of the glasses before purchasing them.

It would be desirable to have a tag that permits the display of eyeglasses on a standard peg-board display system without having the glasses in a closed package, and to have the tag located on the product so that the purchaser has an unobstructed view of the glasses on their face so that they can get the full feel of the appearance before the purchase is made. The present invention provides such a display tag for eyeglasses.

SUMMARY OF THE INVENTION

In accordance with the preferred embodiment of the present invention there is disclosed an apparatus and a method of using the apparatus for hanging eyewear for display at the point of sale while permitting the potential customer to try on the eyewear without the hanger means interfering with the person of the wearer. The apparatus includes hanger means with a body portion that defines a first aperture therethrough adapted to receive a horizontally extending cantilevered support at the time of display, a second aperture therethrough spaced apart below and in parallel relationship with said first aperture and sized to receive the tongue section of the hanger means, and third and forth apertures therethrough spaced apart from each other, below the second aperture, and in parallel relationship to each other and the first and second apertures to receive the same one of the temple pieces of the eyewear for display at a point of sale. The hanger means further includes a tongue portion extending from the body portion away from the third and forth apertures with the longitudinal axis of the tongue portion being in substantially perpendicular relationship with the first through fourth apertures.

Optionally, the hanger means further includes an adhesive tag means for sealing the tongue portion to the temple piece of the eyewear to which the hanger means in installed.

The method of using this apparatus includes the steps of bending the end of the tongue portion of the hanger means up to and passing it through the first aperture to create a loop, inserting the end of one of the temple pieces of the eyewear through the fourth aperture into the center of the loop formed above with the inner side of the temple piece facing away from the side of the body portion into which the end of the tongue portion was passed through, continuing to pass the end of the temple piece further through the fourth aperture and then through the third aperture until the hanger means is adjacent the hinge between the temple piece and the lens holding region of the eyewear, passing the remainder of the tongue portion through the first aperture and bending the tongue portion downward to bring it into contact with the outer surface of the temple piece to which the hanger means has been installed.

The method of installing the hanger means also optionally includes sealing the tongue portion to the temple piece of the eyewear to which the hanger means in installed with an adhesive tag means.

DESCRIPTION OF THE PREFERRED EMBODIMENT OF THE INVENTION

FIGS. 3A-D the procedure for attaching the hang-tag of the present invention to a pair of eyeglasses for vertical display of the eyeglasses at the point of sale.

Figures 1, 2:
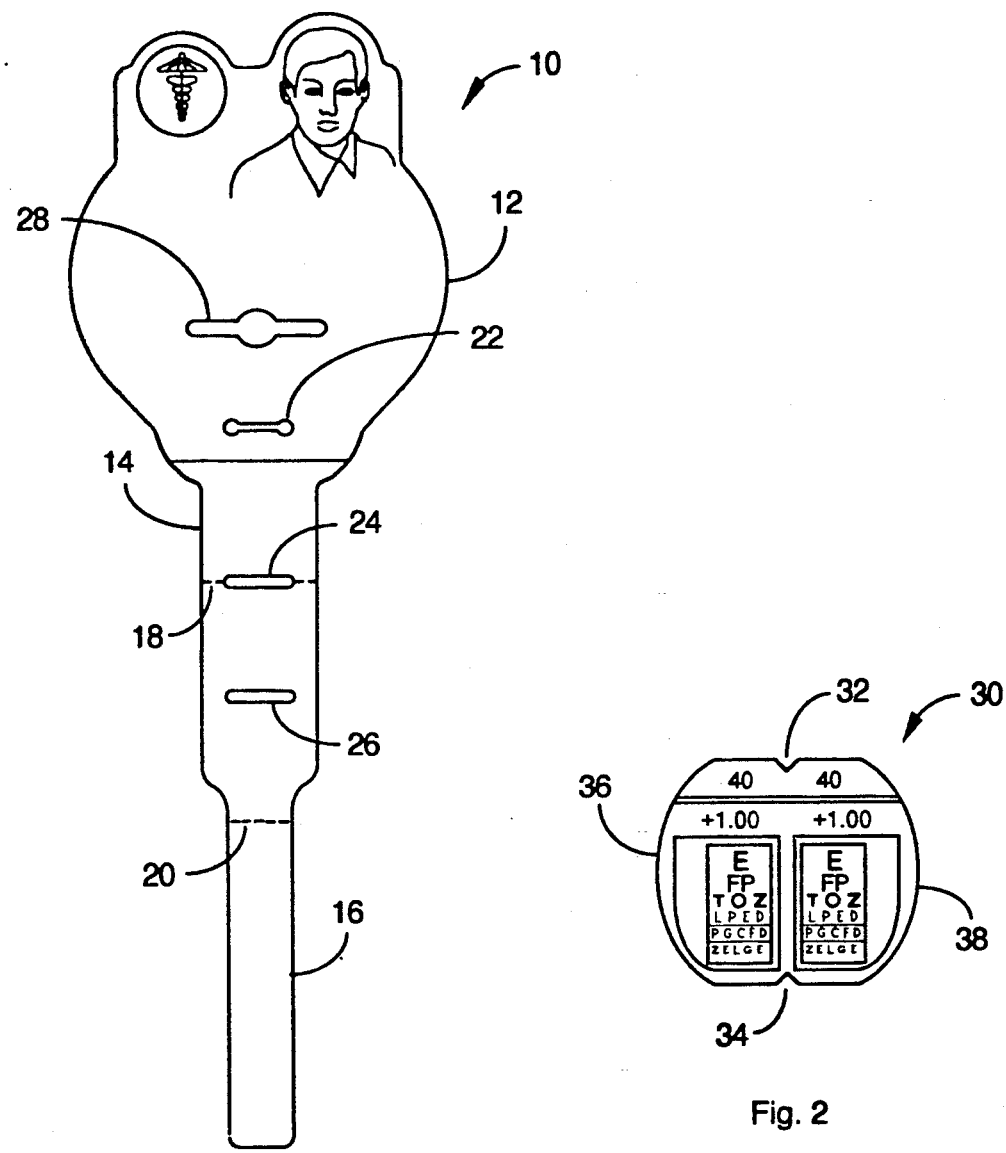
FIG. 1 is a front view of the hang-tag of the present invention.
FIG. 2 is a plan view of the self adhesive sealing tag for use with the hang-tag of FIG. 1.

FIG. 4 is a partial plan view of the hang-tag of FIG. 1 installed on a left temple piece of a pair of eyeglasses.

FIG. 5 is a front view of a pair of eyeglasses to which the hang-tag of FIG. 1 has been attached for vertical display of the eyeglasses at the point of sale.

Description of the Preferred Embodiment of the Invention

In FIG. 1 there is shown a plan view of a hang-tag 10 of the present invention prior to attachment to the eyeglasses to be displayed. Hang-tag 10 is made of a thin plastic, or similar material, that is flexible and can be bent back on itself to permit it to be attached to an article by capturing a specific portion of the article. Hag-tag 10 includes three regions starting from the top and extending to the bottom, namely, and in that order, hanging and advertising region 12, temple slot region 14, and tongue region 16.

The hanging and advertising region 12 includes three features: tongue slot 22, display hanger slot 28, and an upper area for printed advertising material. Similarly, the temple slot region 14 includes three features: upper temple slot 24, lower temple slot 26, and first score line 18. Tongue region 16 includes near its upper end, second score line 20. The purpose of each of these features will become clear from the discussions of the following figures. While the specified locations of the various slots and score lines for the particular embodiment shown in the accompanying figures are located as described above, alternative embodiments can be produced that have these features located in other regions of hang-tag 10. The locational order of these features is more important than their actual location.

So that the eyeglasses, when displayed at the point of sale, hang substantially vertically, it is necessary that each of slots 22, 24, 26 and 28 be centered with respect to the longitudinal axis of hang-tag 10, and that the short axis of each of those slots be substantially parallel to each other. Additionally, since upper and lower temple slots 24 and 26 must be larger than the temple piece of the eyeglasses that they are to accommodate, temple slot region 14 must be wider than the temple piece of the eyeglasses. Also, since tongue region 16, as will be discussed below, is designed to be sealed to the side of the temple piece of the eyeglasses for display, tongue region 16 should be narrower than the temple piece of the eyeglasses. Further, tongue slot 22 must be at least slightly wider than tongue region 16, and display hanger slot 28 must be sized to fit around the selected hanger arm of the display unit on which the eyeglasses will be placed at the point of sale.

Figure 3D:
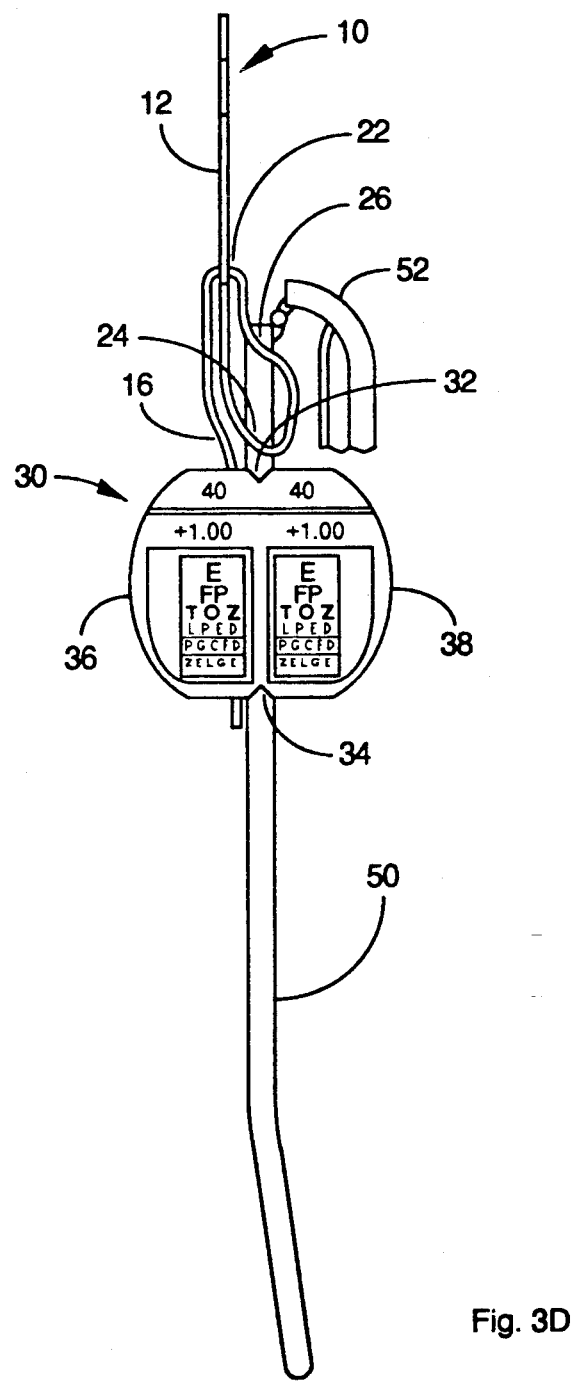

FIG. 2 shows an adhesive sealing tag 30 that may be used to seal tongue region 16 to the temple piece of the eyeglasses as described with respect to FIGS. 3D, 4 and 5. Typically one face of tag 30, the face that is shown in FIG. 2, will carry information and advertising information about the product, and the other face, the face to is not shown in FIG. 2, will have a continuous adhesive coating over at least one half of that face so that the two halves of tag 30 will stick to each other and to the temple piece of the eyeglasses when it is installed as discussed below. As will be seen from the following discussions, the use of tag 30 is optional since its primary purpose is to seal tongue region 16 to the temple piece of the eyeglasses to prevent the removal of hang-tag 10 from the eyeglasses, either accidentally or on purpose. Tag 30 is not necessary for displaying the eyeglasses in the vertical position, however, it will probably always be used to insure that there is always a hang-tag by which to hang the eyeglasses, and to minimize the theft of eyeglasses from the point of sale by simply removing hang-tag 10 and slipping the eyeglasses into one's pocket.

Tag 30 is shown here shaped as back-to-back "D" sections 36 and 38 with top and bottom notches 32 and 34 dividing the two "D" sections. As shown here, tag 30 is for optical reading glasses and it includes the power of the eyeglasses for easy identification at the point of sale. This tag could also be a plain tag with the optical power of the reading glasses included on the hanging and advertising region 12 of hang-tag 10 or the inner surface of the temple pieces of the eyeglasses; or tag 30 could be blank, of a different shape, or for a different product, e.g. sunglasses.

FIGS. 3A–D illustrate the method of installing hang-tag 10 onto the left temple piece 50 of a pair of eyeglasses. First, the end of tongue region 16 is inserted into tongue slot 22 on the side of hanging and advertising region 12 that is to face the customer at the point of sale (i.e. the side that bears the advertising material is on the same side of region 12 as the front of glasses 52 will be) following arrows 21 and 23. Temple slot region 14, as this process continues naturally folds along first score line 18.

Before tongue 16 is fully inserted into slot 22, the end of temple piece 50 is inserted through lower temple slot 26 and then through upper temple slot 24 inside the loop formed by the insertion of tongue 16 into slot 22, following arrow 25. The orientation of temple piece 50 as it is inserted into the two slots 26 and 24 is with the inside of temple piece 50 facing away from, i.e. in the same direction as, the advertising material on region 12. This orientation will insure that the lenses of the eyeglasses are displayed toward the customer at the point of sale.

The next step is to extend tongue 16 further through slot 22 until second score line 20 lines up with slot 22 and tongue 16 is then folded downward along the backside of temple slot region 14 above temple slot 24 and then along the outer side of temple piece 50. Tag 10 is then slide along temple piece 50 to the hinge with front of glasses 52 in the direction of arrow 51. In FIG. 3C tag 10 is in its final position with tongue 16 extending along temple piece 50 away from the hinge and the advertising side of region 12 facing in the direction of front of glasses 52.

FIG. 3D is a top side view of the eyeglasses with tag 10 installed in the final position with adhesive tag 30 located and ready to be installed to hold tag 10 in place. To install tag 30, notches 32 and 34 are first aligned with the top side of temple piece 50. "D" section 36 is then folded downward to capture the end of tongue 16 and the outer side surface of temple piece 50. "D" section 38 is folded downward to capture the inside of temple piece 50 and the exposed portion of the adhesive side of "D" section 36 to complete the seal. By installing tag 30 in this way, the surface of tag 30 will be parallel to the cheek of a customer when the eyeglasses are tried on.

FIG. 4 has been included to show tag 10 in place without adhesive tag 30 when viewed from the outer side of temple piece 50 (for convenience of illustration the front of glasses 52 and the other temple piece have been omitted from this view). Note tongue 16 extends downward along the outer surface of temple piece 50 to a point below upper temple slot 24.

Finally, in FIG. 5 there is shown the completed unit of the eyeglasses and the hang-tag 10 ready for display at the point of sale. Note tag 30 is viewed through the left lens of the eyeglasses. Additionally, hanger slot 28 has been designed to accommodate the two most popular peg-board display supporting arms, i.e. the single wire support arm and the elongated "U" shaped support arm. Slot 28 has an enlarged central hole to accommodate the single wire type support arm, and a horizontally oriented, elongated slot to accommodate the "U" shaped support arm.

In the above discussion tag 10 was described as being installed on the left temple piece of the eyeglasses. Tag 10 could alternately be installed on the right temple piece in the same way without redesigning tag 10. It is suggested that tag 10 be always installed on the same side temple piece so that all of the eyeglasses being displayed are oriented in the same direction. To create a symmetrical appearance at the point of sale, some eyeglass designs could have tag 10 on one side and other designs could have tag 10 on the other side. This would allow designs for men to be displayed with one orientation and those for women to be displayed with the other orientation, for example.

It should also be noted that with the placement of tag 10 as shown and described above, the potential purchaser of the eyeglasses or sunglasses is free to remove the glasses from the display and try them on without any interference from tags 10 and 30. Tags 10 and 30 as located not only do not touch the face of the potential purchaser when the glasses are being tried on, tag 10 does not cover any portion of the individuals face so that they can get a true feel for the appearance of the glasses on their face before they purchase them and before removing the tag.

Further, from the foregoing description, it will be apparent that the invention disclosed herein provides a novel and advantageous hang-tag for use with eyeglasses at the point of sale. As will be understood by those familiar with the art, the invention may be embodied in other specific forms without departing from the spirit or essential characteristics thereof. The scope of the present invention is limited only by to scope of the claims appended hereto.

What is claimed is:

1. Hanger means for displaying an eyewear article at the point of sale that permits said article to be tried on in the normal wearing position with said hanger means in position without said hanger means interfering with the person of the wearer wherein said eyewear includes a pair of temple pieces hingedly attached to opposite ends of a lens holding section, said hanger means comprising:

a body portion defining:
   a first aperture therethrough adapted to receive a horizontally extending cantilevered support at the time of display;
   a second aperture therethrough spaced apart below and in parallel relationship with said first aperture and sized to receive the tongue section of the hanger means; and
   third and forth apertures therethrough spaced apart from each other, below said second aperture, and in parallel relationship to each other and said first and second apertures to receive the same one of said temple pieces of said eyewear for display at a point of sale; and
   a tongue portion extending from said body portion away from said third and forth apertures with the longitudinal axis of said tongue portion being in substantially perpendicular relationship with said first through fourth apertures.

2. Hanger means as in claim 1 wherein said body portion further includes an advertising region above said first aperture for inclusion of trademark and other information for product identity.

3. Hanger means as in claim 1 further including adhesive tag means for sealing said tongue portion to the temple piece of the eyewear to which the hanger means in installed.

4. A method for displaying eyewear at the point of sale wherein said eyewear has a pair of temple pieces hingedly attached at opposite ends of a lens holding region, said display being facilitate by hanger means having a body portion defining a first aperture therethrough adapted to receive a horizontally extending cantilevered support at the time of display, a second aperture therethrough spaced apart below and in parallel relationship with said first aperture and sized to receive the tongue section of the hanger means, and third and forth apertures therethrough spaced apart from each other, below said second aperture, and in parallel relationship to each other and said first and second apertures to receive the same one of said temple pieces of said eyewear for display at a point of sale, and a tongue portion extending from said body portion away from said third and forth apertures with the longitudinal axis of said tongue portion being in substantially perpendicular relationship with said first through fourth apertures, said method comprising the steps of:

a. bending the end of the tongue portion of the hanger means up to and passing it through said second aperture to create a loop;
   b. inserting the end of one of the pair of temple pieces of said eyewear through the fourth aperture into the center of the loop formed in step a. with the inner side of said temple piece facing away from the side of the body portion into which the end of said tongue portion was passed through in step a.;
   c. continuing to pass the end of the one of said temple pieces of step b. further through fourth aperture and then through said third aperture until said hanger means is adjacent the hinge between the temple piece and the lens holding region of the eyewear; and
   d. passing the remainder of said tongue portion through said first aperture and bending the tongue portion downward to bring it into contact with the outer surface of the temple piece to which said hanger means has been installed.

5. A method of displaying eyewear at the point of sale as in claim 4 wherein said hanger means further includes adhesive tag means, and wherein said method further includes the step of:

e. sealing said tongue portion to the temple piece of the eyewear to which the hanger means in installed with said adhesive tag means.

* * * * *